United States Patent
Schwartz

(10) Patent No.: US 7,346,311 B1
(45) Date of Patent: Mar. 18, 2008

(54) SINGLE FREQUENCY REPEATER

(75) Inventor: Hugh Warren Schwartz, Glen Burnie, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 485 days.

(21) Appl. No.: 11/116,168

(22) Filed: Apr. 25, 2005

(51) Int. Cl.
H04B 7/14 (2006.01)

(52) U.S. Cl. .................. 455/7; 455/11.1; 455/13.4; 455/24; 455/127.1

(58) Field of Classification Search .......... 455/7, 455/11.1, 13.4, 24, 127.1
See application file for complete search history.

(56) References Cited

U.S. PATENT DOCUMENTS

| 4,317,217 A | 2/1982 | Davidson et al. |
| 4,383,331 A | 5/1983 | Davidson |
| 6,430,391 B1 | 8/2002 | Dent et al. |
| 6,657,536 B1* | 12/2003 | Avenel ............... 340/5.61 |
| 6,768,900 B2 | 7/2004 | Dent et al. |
| 7,009,573 B2* | 3/2006 | Hornsby et al. ....... 343/770 |
| 2006/0205343 A1* | 9/2006 | Runyon et al. ........ 455/11.1 |

\* cited by examiner

*Primary Examiner*—Sanh D. Phu
(74) *Attorney, Agent, or Firm*—Eric Froehlich

(57) ABSTRACT

A novel single frequency repeater is disclosed that eliminates the problems of feedback and concurrent oscillation. The single frequency repeater of the present invention comprises a backplane, a first antenna, a filter, an amplifier, a power supply, a switch, and a second antenna. The first antenna, filter, amplifier, power supply, and switch are mounted to one side of the backplane. Preferably, the backplane is electrically grounded. The second antenna is mounted on the second side of the backplane, in an orthogonal direction to the first antenna on the first side of the backplane. By placing the first antenna in the back lobe of the second antenna, separating the first antenna and the second antenna with the grounded backplane, and mounting the second antenna in an orthogonal orientation to the first antenna, problems with feedback and concurrent oscillation have been overcome.

4 Claims, 3 Drawing Sheets

SINGLE FREQUENCY REPEATER

FIELD OF THE INVENTION

The present invention relates, in general, to telecommunications, and, in particular to a single frequency carrier wave repeater.

BACKGROUND OF THE INVENTION

A repeater is a combination transmitter and receiver that is used to extend the effective range of a transmitter. The repeater receives a signal at a particular frequency and power level, and rebroadcasts the signal at a higher power level. This allows broadcast signals to extend greater distances and can fill holes in coverage due to shielding from obstacles.

Typical prior art methods receive one frequency and retransmit at a second frequency. These methods are effective at eliminating spillover but require more of the spectrum to be used.

U.S. Pat. Nos. 6,430,391, and 6,768,900, both entitled "DUPLEX SATELLITE COMMUNICATION USING A SINGLE FREQUENCY OR PAIR," discloses a system using a pair of frequencies. Two ground stations use the same frequencies, which creates interference. The system records the outgoing signal from at least one of the ground signal, and subtracts the outgoing signal to eliminate its interference. The system prerecording of signals and a time lag while the prerecorded signal is subtracted. The present invention is not limited in either regard. U.S. Pat. Nos. 6,430,391, and 6,768,900 are hereby incorporated by reference into the specification of the present invention.

Other methods use a single frequency to receive and retransmit the signal. These methods can suffer from oscillation.

U.S. Pat. No. 4,317,217, entitled "TAG GENERATOR FOR A SAME-FREQUENCY REPEATER," discloses a method of adding a tag to the output signal. A tagged signal of variable amplitude and phase is added to the received signal to cancel the tag. The invention requires complex electronics to add and remove the tag. The present invention is not limited in this regard. U.S. Pat. No. 4,317,217 is hereby incorporated by reference into the specification of the present invention.

U.S. Pat. No. 4,383,331, entitled "METHOD AND MEANS OF PREVENTING OSCILLATIONS IN A SAME-FREQUENCY REPEATER," discloses a method of adding a tag to the signal to be rebroadcast. Each subsequent repeater in the system includes a system of removing the previously applied tag. A phase adjustment and a time lag are introduced into the rebroadcast signal. The invention requires complex electronics to add the tag, remove the tag, and creates a time lag. The present invention is not limited in either regard. U.S. Pat. No. 4,383,331 is hereby incorporated by reference into the specification of the present invention.

SUMMARY OF THE INVENTION

It is an object of the present invention to provide a single frequency repeater, which eliminates feedback and concurrent oscillation.

The repeater of the present invention places the receiving antenna and the transmitting antenna in each other's back lobe, with the transmitting antenna oriented in an orthogonal direction to the receiving antenna.

The single frequency repeater according to the present invention includes a backplane, a receiving antenna, a filter, an amplifier, a power supply, a switch, and a transmitting antenna.

The backplane provides a convenient place to mount all the components and is electrically grounded. The backplane has a first surface and a second surface.

The receiving, or first, antenna is mounted on the first surface of the backplane, and has an output.

The filter is also mounted on the first surface of the backplane and has an output and an input that is connected to the output of the first antenna.

An amplifier is mounted on the first surface of the backplane. The amplifier has an input and an output. The input is connected to the output of the filter. A power supply and switch, also mounted to the first surface of the backplane provide power to the amplifier and permit remote activation, respectively.

A second, or transmitting antenna is mounted on the second surface of the backplane, and is oriented in an orthogonal direction to the first antenna on the first surface. The second antenna has an input connected to the output of the amplifier. The second antenna retransmits the amplified signal at the same frequency.

DETAILED DESCRIPTION

The present invention comprises a novel single frequency repeater that receives a signal having a single frequency and relatively low power level, and retransmits the signal at the same frequency but at a higher power level. The single frequency repeater of the present invention is designed to avoid the problems of feedback and concurrent oscillation.

Single frequency repeaters efficiently use the broadcast spectrum, eliminating the need to retransmit a signal at a second frequency.

Figure 1:
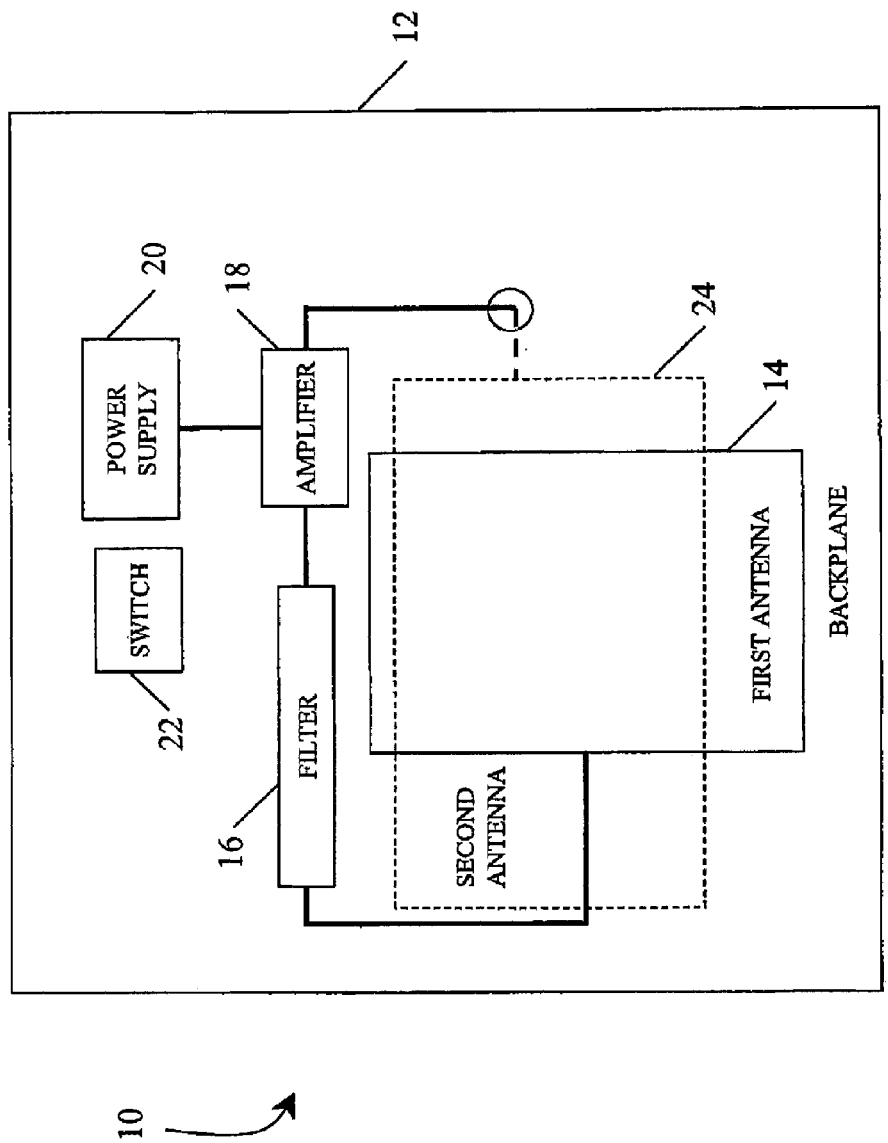
FIG. 1 is a plan view of the present invention.

Referring to FIG. 1, a single frequency repeater 10 according to the present invention is shown. The single frequency repeater 10 has a backplane 12, a first antenna 14, a filter, 16, an amplifier 18, a power supply 20, a switch 22, and a second antenna 24.

Figure 3:
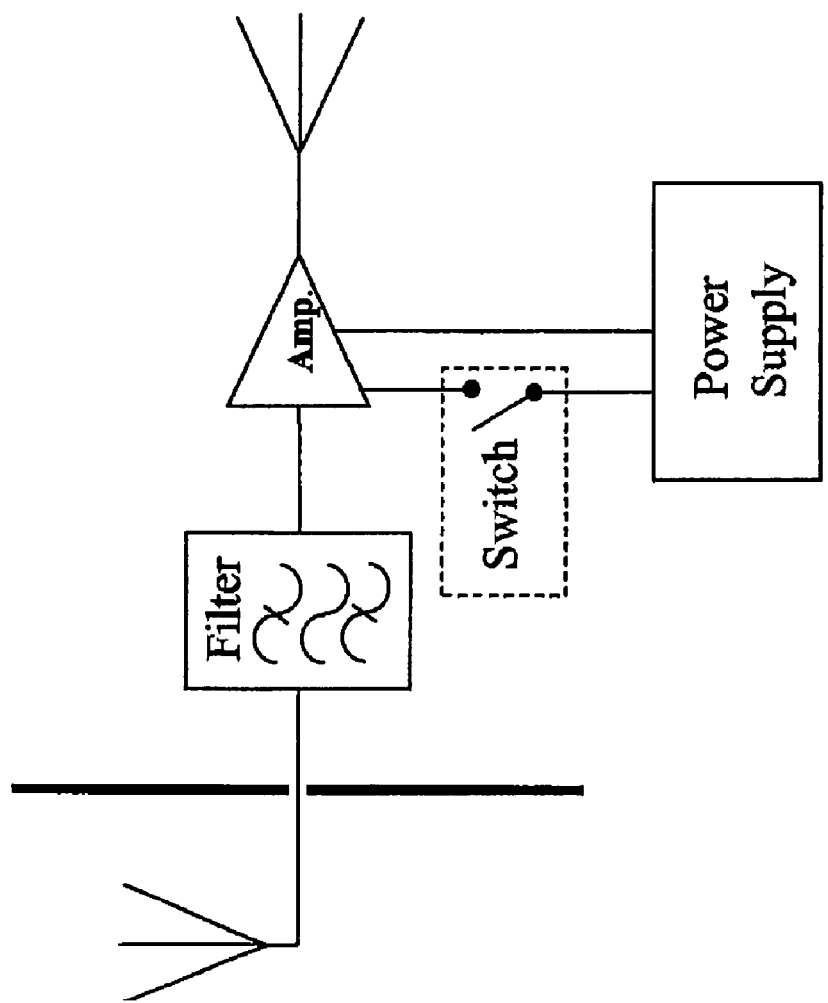
FIG. 3 is schematic of the present invention.

A schematic of the single frequency repeater 10 is shown in FIG. 3.

Referring again to FIG. 1, the backplane 12 has a first surface and a second surface. Preferably, the backplane 12 is constructed of metal, and is electrically grounded. The metal ground plane helps to provide port to port isolation between the first antenna 14 and the second antenna 24. The remaining components are mounted on the backplane 12 using any fastening method known to those persons skilled in the art.

A first antenna 14 is mounted to the first surface of the backplane 12. In practice, a cavity backed slot array antenna operating with of a frequency of between 900 MHz and 2,200 MHz has been found to work well with the single frequency repeater 10 of the present invention. The first antenna 14 also has an output, wherein the received signal is accessible for further processing.

A filter 16 is mounted on the first surface of the backplane 12, and has an input and an output. Preferably, the filter 16 is a bandpass filter, with a bandpass 100 MHz wide. The input of the filter 16 is connected electrically to the output of the first antenna 14. In practice, flexible semi-rigid coaxial cable has been used to connect the input of the filter 16 to the output of the first antenna 14.

An amplifier 18 is mounted on the first surface of the backplane 12. The amplifier 18 has an input and an output. The input of the amplifier 18 is electrically connected to the output of the filter 16. The amplifier boosts the signal strength of the received signal. In practice, amplification of 40 dB has been achieved. Flexible semi-rigid coaxial cable has been used to connect the output of the filter 16 to the input of the amplifier 18.

A power supply 20 is also mounted to the first surface of the backplane 12. The power supply is preferably a switching power supply, and provides power to the amplifier 18.

A switch 22 is mounted to the first surface of the backplane 12. The switch 22 is electrically connected to the power supply 20 or the amplifier 18, permitting remote activation of the single frequency repeater 10. Those persons skilled in the art will recognize that the switch 22 may be incorporated into the power supply 20.

A second antenna 24 is mounted on the second surface of the backplane 12, in an orthogonal orientation to the mounting of the first antenna 14 on the first side of the backplane 12. The output of the amplifier 18 is electrically connected to the input of the second antenna 24, preferably with flexible semi-rigid coaxial cable.

The single frequency repeater 10 of the present invention is designed to amplify RF signals into a facility when mounted inside a wall. By placing the first antenna 14 in the back lobe of the second antenna 24, separating the first antenna 14 and the second antenna 24 with the grounded backplane 12, and mounting the second antenna 24 in an orthogonal orientation to the first antenna 12, problems with feedback and concurrent oscillation have been overcome.

Figure 2:
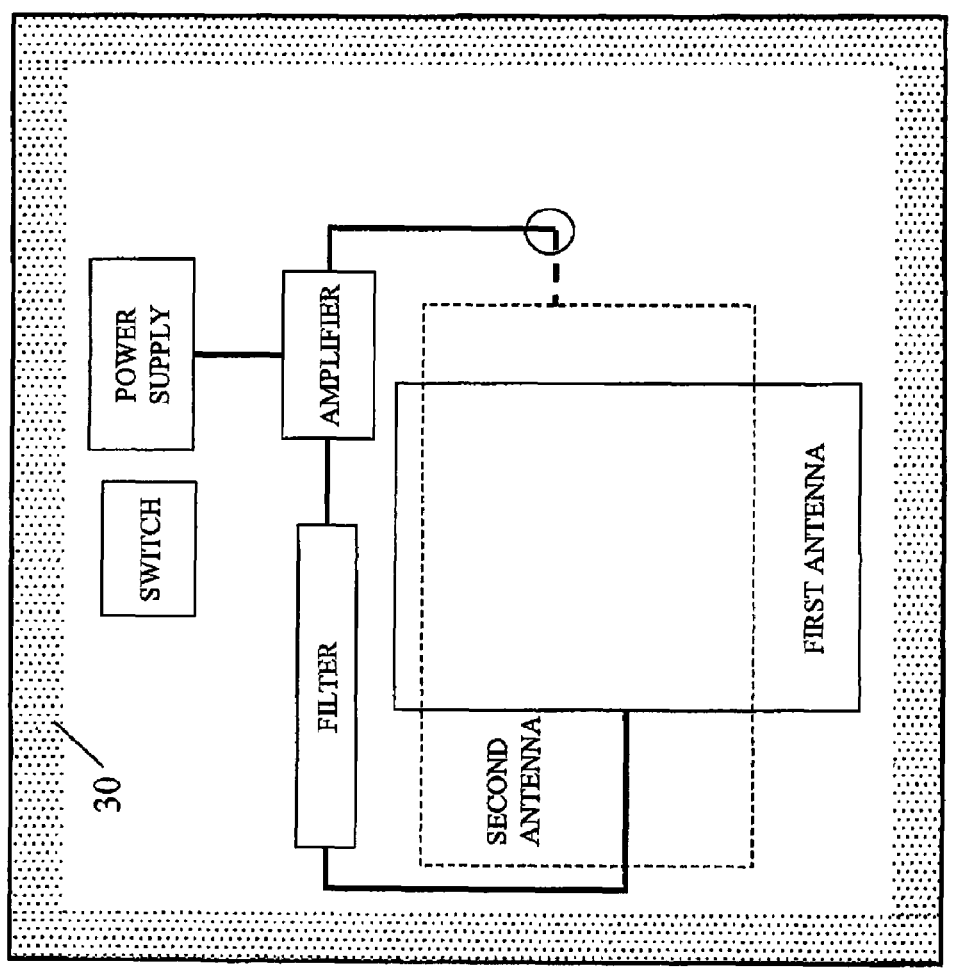
FIG. 2 is an alternate embodiment of the present invention.

As shown in FIG. 2, in an alternate embodiment, absorbent material 30, absorbent to microwave radiation is placed on the perimeter of the backplane 12 to decrease diffraction backscatter (feedback).

While the preferred embodiments of the invention have been illustrated and described, it will be apparent to those of ordinary skill in the art that various changes and modifications may be made without deviating from the inventive concepts set forth above.

What is claimed is:

1. A single frequency repeater, comprising:
   a) a backplane, said backplane having a first surface and a second surface;
   b) a first antenna, said first antenna affixed to the first surface of said backplane, and having an output;
   c) a filter, said filter affixed to the first surface of said backplane, having an input and an output, said input connected electrically to the output said first antenna;
   d) an amplifier, said amplifier affixed to the first surface of said backplane, having an input and an output, said input connected electrically to the output of said filter;
   e) a power supply, said power supply affixed to the first surface of said backplane, the power supply electrically connected to the amplifier;
   f) a switch, said switch electrically connected to said power supply; and
   g) a second antenna, said second antenna affixed to the second surface of said backplane and having an input, said second antenna affixed in an orthogonal orientation to said first antenna on said first surface of the backplane, and the input of said second antenna connected electrically to the output of said amplifier.

2. The device of claim 1, further comprising an absorbent material on the perimeter of said backplane, said absorbent material absorbent to microwave radiation.

3. The device of claim 2, wherein said backplane is electrically grounded.

4. The device of claim 1, wherein said backplane is electrically grounded.

* * * * *